United States Patent
Best et al.

(10) Patent No.: US 10,359,936 B2
(45) Date of Patent: Jul. 23, 2019

(54) SELECTING A PRIMARY STORAGE DEVICE

(71) Applicant: INTERNATIONAL BUSINESS MACHINES CORPORATION, Armonk, NY (US)

(72) Inventors: Steven F. Best, Groton, MA (US); Janice M. Girouard, Austin, TX (US); Robert E. Reiland, Raleigh, NC (US); Yehuda Shiran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/801,346

(22) Filed: Nov. 2, 2017

(65) Prior Publication Data
US 2018/0052602 A1 Feb. 22, 2018

Related U.S. Application Data

(63) Continuation of application No. 15/334,905, filed on Oct. 26, 2016, now Pat. No. 9,916,094, which is a (Continued)

(51) Int. Cl.
G06F 3/06 (2006.01)
H04L 12/26 (2006.01)

(52) U.S. Cl.
CPC .......... *G06F 3/0604* (2013.01); *G06F 3/067* (2013.01); *G06F 3/0613* (2013.01);
(Continued)

(58) Field of Classification Search
CPC .... G06F 3/0604; G06F 3/0613; G06F 3/0632; G06F 3/0634; G06F 3/0653; G06F 3/067; G06F 3/065; H04L 43/0888
(Continued)

(56) References Cited

U.S. PATENT DOCUMENTS 6,457,098 B1 9/2002 DeKoning et al.
6,615,313 B2 9/2003 Kato et al.
(Continued)

OTHER PUBLICATIONS

"SoftRAID 2.2.2 vs. SoftRAID 3 Comparison" SoftRAID LLC. Wayback Machine, Jan. 9, 2013. <http://web.archive.org/web/20130109185117/http://www.softraid.com/2vs3.htm>.
(Continued)

*Primary Examiner* — Nicholas R Taylor
*Assistant Examiner* — Chong G Kim
(74) *Attorney, Agent, or Firm* — Tihon Poltavets

(57) ABSTRACT

A method for determining a primary storage device and a secondary storage device for copies of data comprises determining metrics data for at least two storage devices located on different servers in a computing environment. The method further comprises adjusting the metrics data using a predefined weighting factor for read data blocks rates and a predefined weighting factor for written data blocks rates, where the predefined weighting factor for the written data blocks rates is higher than the predefined weighting factor for the read data blocks rates. The method further comprises selecting a storage device of the at least two storage devices as a primary storage device based, at least in part, on the adjusted metrics data for each of the at least two storage devices.

12 Claims, 4 Drawing Sheets

| | METRICS | STORAGE 70 | STORAGE 80 | SERVER COMPUTER 40 | SERVER COMPUTER 50 | WEIGHTING FACTOR | STORAGE 70 (ADJUSTED) | STORAGE 80 (ADJUSTED) |
|---|---|---|---|---|---|---|---|---|
| 212 | READ DATA BLOCKS RATE (PER MINUTE) | 10.00 | 20.00 | | | 0.25 | 2.50 | 5.00 |
| 214 | WRITTEN DATA BLOCKS RATE (PER MINUTE) | 20.00 | 10.00 | | | 0.50 | 10.00 | 5.00 |
| 216 | NETWORK TRAFFIC (PACKETS PER MINUTE) | | | 100.00 | 50.00 | 0.25 | 25.00 | 12.50 |
| 218 | TOTAL I/O THROUGHPUT | | | | | | 37.50 | 22.50 |

Columns: 210, 220, 230, 240, 250, 260, 270, 280

Related U.S. Application Data continuation of application No. 14/060,790, filed on Oct. 23, 2013, now Pat. No. 9,535,612.

(52) U.S. Cl.
CPC .......... *G06F 3/0632* (2013.01); *G06F 3/0634* (2013.01); *G06F 3/0653* (2013.01); *H04L 43/0888* (2013.01); *G06F 3/065* (2013.01)

(58) Field of Classification Search
USPC ....................................................... 709/235
See application file for complete search history.

(56) References Cited

U.S. PATENT DOCUMENTS

| | | | |
|---|---|---|---|
| 7,315,960 B2 | 1/2008 | Takamoto et al. | |
| 7,353,335 B2 | 4/2008 | Kawamura | |
| 7,395,451 B2 | 7/2008 | Takahashi et al. | |
| 8,024,518 B1 | 9/2011 | Malaiyandi et al. | |
| 8,065,481 B1 | 11/2011 | Hiller et al. | |
| 8,583,838 B1 | 11/2013 | Marshak et al. | |
| 8,688,878 B1 | 4/2014 | Dolan et al. | |
| 8,856,397 B1 | 10/2014 | Marshak et al. | |
| 8,935,493 B1 | 1/2015 | Dolan et al. | |
| 8,972,694 B1 * | 3/2015 | Dolan | G06F 13/28 711/170 |
| 9,026,765 B1 | 5/2015 | Marshak et al. | |
| 9,043,184 B1 | 5/2015 | Gabay et al. | |
| 9,053,167 B1 | 6/2015 | Swift et al. | |
| 9,218,264 B2 | 12/2015 | Xavier et al. | |
| 9,274,954 B1 | 3/2016 | Bairavasundaram et al. | |
| 9,507,887 B1 | 11/2016 | Wang et al. | |
| 9,535,612 B2 | 1/2017 | Best et al. | |
| 9,952,803 B1 * | 4/2018 | Dolan | G06F 3/0653 |
| 2003/0163469 A1 | 8/2003 | Garth et al. | |
| 2006/0085610 A1 * | 4/2006 | Iwamura | G06F 11/1662 711/162 |
| 2007/0143497 A1 | 6/2007 | Kottomtharayil et al. | |
| 2007/0288710 A1 | 12/2007 | Boyd et al. | |
| 2008/0172572 A1 * | 7/2008 | Beardsley | G06F 11/2069 714/6.12 |
| 2009/0006734 A1 * | 1/2009 | Kishi | G06F 3/0611 711/111 |
| 2009/0249013 A1 | 10/2009 | Daud et al. | |
| 2012/0192006 A1 | 7/2012 | Qi et al. | |
| 2012/0246424 A1 * | 9/2012 | Yuhara | G06F 11/1456 711/162 |
| 2013/0007503 A1 | 1/2013 | Anaya et al. | |
| 2013/0054807 A1 | 2/2013 | Sherwood et al. | |
| 2013/0060948 A1 | 3/2013 | Ulrich et al. | |
| 2013/0185487 A1 | 7/2013 | Kim et al. | |
| 2013/0294239 A1 | 11/2013 | Szabo et al. | |
| 2014/0059207 A1 | 2/2014 | Gulati et al. | |
| 2014/0068012 A1 | 3/2014 | Liu | |
| 2014/0081919 A1 * | 3/2014 | Matsumoto | G06F 11/3495 707/652 |
| 2014/0164449 A1 | 6/2014 | Kim et al. | |
| 2014/0325095 A1 * | 10/2014 | Kang | G06F 11/3485 710/16 |
| 2015/0032696 A1 | 1/2015 | Camble et al. | |
| 2015/0046668 A1 | 2/2015 | Hyde, II et al. | |
| 2015/0113090 A1 | 4/2015 | Best et al. | |
| 2017/0046071 A1 | 2/2017 | Best et al. | |
| 2017/0078378 A1 | 3/2017 | Svoboda et al. | |

OTHER PUBLICATIONS

IBM, List of IBM Patents or Patent Applications Treated as Related, Appendix P, dated Nov. 7, 2017, 2 pages.

* cited by examiner

| METRICS (210) | STORAGE 70 (220) | STORAGE 80 (230) | SERVER COMPUTER 40 (240) | SERVER COMPUTER 50 (250) | WEIGHTING FACTOR (260) | STORAGE 70 (ADJUSTED) (270) | STORAGE 80 (ADJUSTED) (280) |
|---|---|---|---|---|---|---|---|
| READ DATA BLOCKS RATE (PER MINUTE) (212) | 10.00 | 20.00 | | | 0.25 | 2.50 | 5.00 |
| WRITTEN DATA BLOCKS RATE (PER MINUTE) (214) | 20.00 | 10.00 | | | 0.50 | 10.00 | 5.00 |
| NETWORK TRAFFIC (PACKETS PER MINUTE) (216) | | | 100.00 | 50.00 | 0.25 | 25.00 | 12.50 |
| TOTAL I/O THROUGHPUT (218) | | | | | | 37.50 | 22.50 |

FIG. 2

SELECTING A PRIMARY STORAGE DEVICE

FIELD OF THE INVENTION

The present invention relates generally to storage systems, and more particularly to using metrics to select a primary storage device and a secondary storage device that each contain a copy of stored data.

BACKGROUND OF THE INVENTION

In today's storage environment, enterprise storage systems automatically generate two copies of data. One copy of the data typically functions as the primary copy and the second copy functions as a backup copy of the primary copy. The primary and secondary copies usually reside on separate devices. The primary copy of the data is typically accessed for a read operation, and the secondary copy usually is not read. Determining which copy will function as the primary copy is usually a static decision. Once the primary copy is identified, it will remain the primary copy unless the primary device experiences technical difficulties and fails to function. The secondary copy is read "if and only if" the read of the primary copy fails. Reading the data sequentially like this provides the advantage of minimizing the total I/O bandwidth to the storage system.

SUMMARY

Aspects of embodiments of the present invention disclose a method, computer program product, and computer system for determining a primary storage device and a secondary storage device for copies of data. One or more processors determine metrics data for at least two storage devices located on different servers in a computing environment. The metrics data includes at least: (i) a read data blocks rate for each respective storage device, the read data blocks rate for a respective storage device being a rate at which data is read from the respective storage device by the storage device's respective server, and (ii) a written data blocks rate for each respective storage device, the written data blocks rate for a respective storage device being a rate at which data is written to the respective storage device by the storage device's respective server. One or more processors adjust the metrics data using a predefined weighting factor for the read data blocks rates and a predefined weighting factor for the written data blocks rates, where the predefined weighting factor for the written data blocks rates is higher than the predefined weighting factor for the read data blocks rates. One or more processors select a storage device of the at least two storage devices as a primary storage device based, at least in part, on the adjusted metrics data for each of the at least two storage devices.

BRIEF DESCRIPTION OF THE SEVERAL VIEWS OF THE DRAWINGS

FIG. 2 depicts a table that includes exemplary metrics data, weighting factors, and calculations for determining a primary storage device and a secondary storage device for a copy of data, in accordance with one embodiment of the present invention.

DETAILED DESCRIPTION

Figure 1:
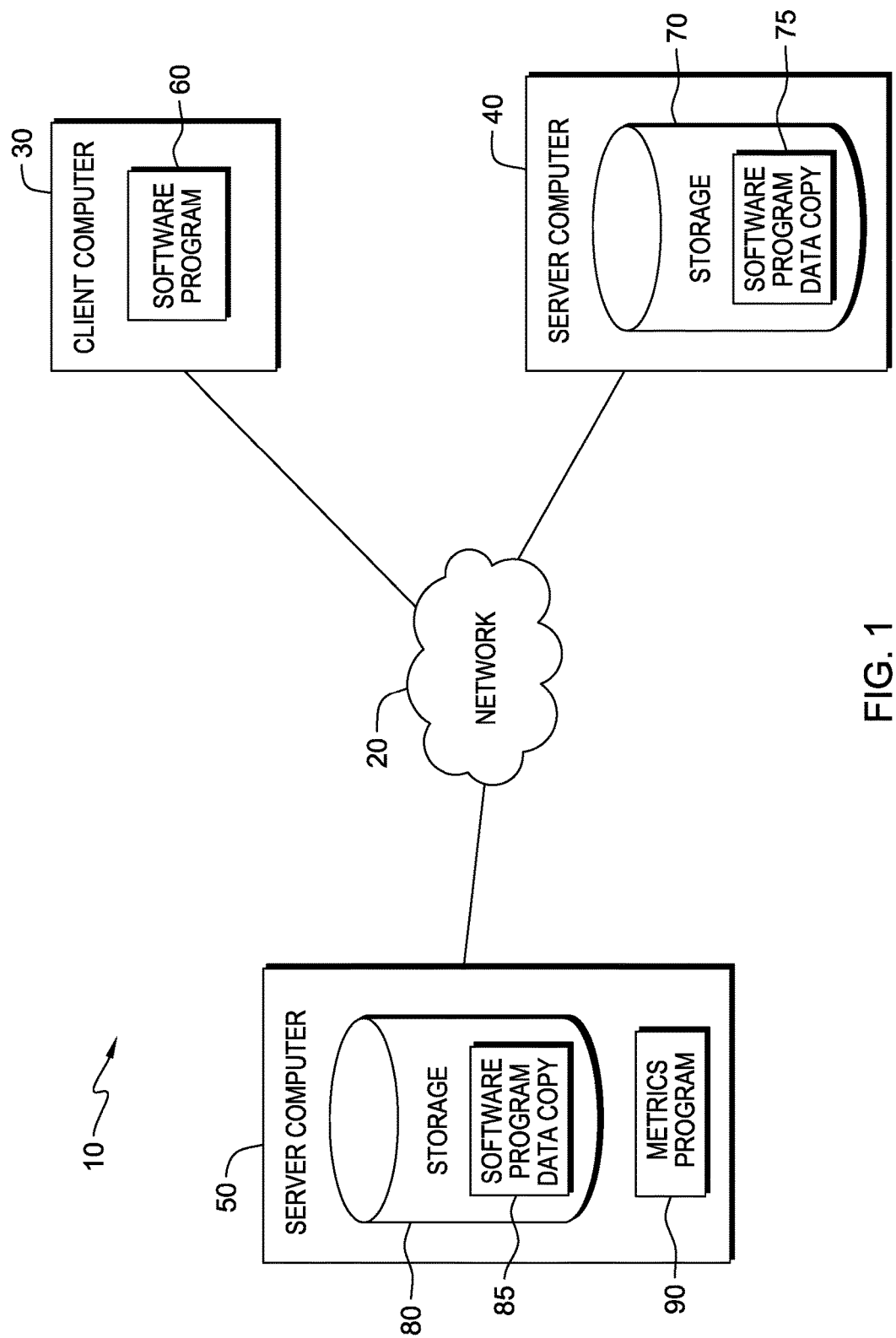
FIG. 1 is a functional block diagram illustrating a distributed data processing environment, in accordance with one embodiment of the present invention.

The level of activity of a storage system is based on the total input/output (I/O) throughput for each device. The I/O throughput could be a function of device read or write rates, or I/O packet counts. The I/O counts might include message traffic counters that include application communication that comes from separate applications that share a system board. In some enterprise systems, the primary copy of data may reside on a device that has a high level of I/O activity, while the secondary copy resides on a device with a relatively low level of I/O activity. This performance anomaly is likely common in a cloud environment where the primary and secondary copies are physically remote from the application server and executed on distinct storage media. The present invention analyzes the I/O throughput for two or more storage devices and, based on the analysis, determines a primary storage device with a lower I/O throughput and a secondary storage device with a higher I/O throughput than the primary storage device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 depicts a diagram of distributed data processing environment 10 in accordance with one embodiment of the present invention. FIG. 1 provides only an illustration of one embodiment and does not imply any limitations with regard to the environments in which different embodiments may be implemented.

Distributed data processing environment 10 includes client computer 30, server computer 40, and server computer 50, interconnected over network 20. Network 20 may be a local area network (LAN), a wide area network (WAN) such as the Internet, a combination of the two or any combination of connections and protocols that will support communications between client computer 30, server computer 40, and server computer 50 in accordance with embodiments of the present invention. Network 20 may include wired, wireless, or fiber optic connections. Distributed data processing environment 10 may include additional server computers, client computers, or other devices not shown.

Client computer 30 may be a desktop computer, laptop computer, tablet computer, personal digital assistant (PDA), or smart phone. In general, client computer 30 may be any electronic device or computing system capable of sending and receiving data, and communicating with server computer 40 and server computer 50 over network 20, in accordance with embodiments of the present invention. In the depicted embodiment, client computer 30 includes software program 60. In one embodiment, client computer 30 includes components described in reference to FIG. 4.

Server computer 40 may be a management server, a web server, or any other electronic device or computing system capable of receiving and sending data. In the depicted embodiment, server computer 40 may represent a server computing system utilizing multiple computers as a server system, such as in a cloud computing environment. In the depicted embodiment, server computer 40 includes storage 70. In another embodiment, server computer 40 may also include storage 80. In yet another embodiment, server computer 40 may also include metrics program 90. In one embodiment, server computer 40 includes components described in reference to FIG. 4.

Server computer 50 may be a management server, a web server, or any other electronic device or computing system capable of receiving and sending data. In the depicted embodiment, server computer 50 may represent a server computing system utilizing multiple computers as a server system, such as in a cloud computing environment. In the depicted embodiment, server computer 50 includes storage 80 and metrics program 90. In another embodiment, server computer 50 may also include storage 70. In one embodiment, server computer 50 includes components described in reference to FIG. 4.

Software program 60 operates on client computer 30. In the depicted embodiment, software program 60 is a generic software program that includes sequences of instructions written to perform a specified task on client computer 30. For example, software program 60 is a word processing program. In another example, software program 60 may be an e-mail client program. In the depicted embodiment, copies of data used or created by software program 60 are stored on storage 70 and storage 80. Periodically, software program 60 sends updated copies of data to server computer 40 and server computer 50 to be stored on storage 70 and storage 80, respectively.

In the depicted embodiment, storage 70 is a hard disk drive. In other embodiments, storage 70 may be any storage device used for storing digital information. Storage 70 includes software program data copy 75. Server computer 40 receives software program data copy 75 from software program 60 over network 20. Server computer 40 stores software program data copy 75 to storage 70.

Software program data copy 75 is a copy of data used or created by software program 60. For example, software program data copy 75 contains all data saved by software program 60. In one embodiment, software program 60 sends software program data copy 75 to server computer 40 to be stored on storage 70. In another embodiment, software program 60 sends software program data to server computer 50. Server computer 50 receives and saves software program data copy 85 and server computer 50 sends software program data to server computer 40 to be stored on storage 70 as software program data copy 75.

Additionally, software program 60 periodically calls server computer 40 to retrieve software program data copy 75. Software program 60 may also periodically send updates of software program data copy 75 to server computer 40 for storage on storage 70. For example, after retrieving software program data copy 75, software program 60 sends an updated copy of software program data copy 75 to server computer 40 to be stored on storage 70.

In the depicted embodiment, storage 80 is a hard disk drive. In other embodiments, storage 80 may be any storage device used for storing digital information. Storage 80 includes software program data copy 85. Server computer 50 receives software program data copy 85 from software program 60 over network 20. Server computer 50 stores software program data copy 85 to storage 80.

Software program data copy 85 is a copy of data used or created by software program 60. Software program data copy 85 includes the same data included in software program data copy 75. For example, software program data copy 85 contains all data saved by software program 60. In one embodiment, software program 60 sends software program data copy 85 to server computer 50 to be stored on storage 80. In another embodiment, software program 60 sends software program data to server computer 40. Server computer 40 receives and saves software program data copy 75 and server computer 40 sends software program data to server computer 50 to be stored on storage 80 as software program data copy 85.

Additionally, software program 60 periodically calls server computer 50 to retrieve software program data copy 85. Software program 60 may also periodically send updates of software program data copy 85 to server computer 50 for storage on storage 80. For example, after retrieving software program data copy 75, software program 60 sends an updated copy of software program data copy 85 to server computer 50 to be stored on storage 80.

Metrics program 90 operates to determine which storage device in a distributed data processing environment will function as a primary storage device for a copy of software program data, and which storage device will function as a secondary storage device for a copy of software program data. In the depicted embodiment, metrics program 90 analyzes metric data for storage 70 and storage 80, and metrics program 90 analyzes metrics data for server computer 40 that contains storage 70 and server computer 50 that contains storage 80. Based on the analyzed metrics, metrics program 90 determines if storage 70 or storage 80 will function as the primary storage device. In the depicted embodiment, metrics program 90 resides on server computer 50. In another embodiment, metrics program 90 resides on server computer 40. In yet another embodiment, metrics program 90 resides on another server computer (not shown) in distributed data processing environment 10, provided metrics program 90 can access server computer 40 and server computer 50.

In one embodiment, metrics program 90 measures metrics data for server computer 40, storage 70, server computer 50, and server computer 80. In another embodiment, metrics program 90 receives metrics data for server computer 40, storage 70, server computer 50, and storage 80 from a separate monitoring program (not shown).

Metrics data includes any data that relates to the I/O throughput of storage 70 and storage 80. For example, metrics data may include a running average of the most recent read data blocks rate, total data blocks rate, and written data blocks rate for each storage device. In computing, a block is a sequence of bits, which are basic units of information in computing and digital communication, having a nominal length. Data thus structured are said to be blocked. The process of putting data into blocks is called blocking. Blocking is used to facilitate the handling of the data-stream by the computer program receiving the data. Blocked data is normally read one whole block at a time. Most file systems are based on a blocking scheme.

Read data blocks rate is expressed in terms of read data blocks per minute. By analyzing a running average of the most recently read data blocks, metrics program 90 analyzes the rate at which blocked data is read from storage 70 and storage 80. For example, metrics can include the rate at which the blocked data making up software program data copy 75 and software program data copy 85 are read from storage 70 and storage 80, respectively.

Written data blocks rate is expressed in terms of written data blocks per minute. By analyzing a running average of the most recent written data blocks to storage 70 and storage 80, metrics program 90 analyzes the rate at which blocked data is written to storage 70 and storage 80. For example, metrics can include the rate at which the blocked data comprising software program data copy 75 and software program data copy 85 are written to storage 70 and storage 80, respectively.

Total data blocks rate is expressed in terms of total data blocks per minute. By analyzing a running average of the most recent total data blocks for storage 70 and storage 80, metrics program 90 analyzes the rate at which blocked data is read from storage 70 and storage 80 and the rate at which blocked data is written to storage 70 and storage 80.

Queue depth is the number of outstanding read and/or write requests waiting to access a hard drive. Performance-demanding applications can generate storage I/Os to create queue depths in the hundreds. Queue depth is generally expressed by a numeric value that represents the number of read and/or write requests waiting to access the hard drive.

In the depicted embodiment, metrics can include the queue depth for each of storage 70 and storage 80. For example, queue depth can be expressed as a numeric value that represents the number of read and/or write requests waiting to access storage 70 and storage 80.

Metrics data may also include I/O throughput of server computer 40 and server computer 50. I/O throughput is often measured in bits per second of a communications link or network access. A typical method of performing a measurement is to transfer a file from one system to another system and measure the time required to complete the transfer or copy of the file. The throughput is then calculated by dividing the file size by the time to get the throughput in megabits, kilobytes, or bits per second.

Metrics data can be evaluated by measuring a running average of the total command execution time of read, write, or total command types from the perspective of a statistical analysis system (SAS) device driver. A SAS device creates graphical output in a specific format. For example, a SAS device can send the graphical output to a file on disk, such as a GIF file. In another example, a SAS device can send the graphical output directly to a hardware device, such as a display connected to a computer. A SAS device consists of two parts: a device entry and device driver.

A SAS device driver is the executable module that produces device-specific commands that a device can understand. Each device entry specifies the name of the SAS device driver that is to be used to generate output. The device driver uses the parameters included in the device entry. In the depicted embodiment, metrics can be measured by evaluating the command execution time, in milliseconds, based on the commands associated with the SAS device driver of server computer 40 and server computer 50.

Metrics may also be measured by evaluating the command execution time, for example in milliseconds, based on the commands of read, written, and total blocks per minute associated with an Open Systems Interconnection application layer. The Open Systems Interconnection (OSI) is a standard description or "reference model" for how messages should be transmitted between any two points in a telecommunication network. Its purpose is to guide product implementers so that their products will consistently work with other products. The reference model defines seven layers of functions that take place at each end of a communication. In one embodiment, metrics data includes the command execution time, in milliseconds, based on the commands of read, written, and total blocks per minute of an application layer In the (OSI) communications model, an application layer provides services for a software program to ensure that effective communication with another software program in a network is possible. The application layer is not the software itself that is doing the communication. For example, the application layer determines that the necessary communication resources exist (i.e. a modem in a computer). In another example, the application layer determines protocol and data syntax rules at the application level.

I/O throughput for distributed data environment 10 may be measured by evaluating the total number of packets transmitted over network 20. A packet is a block of data that is transmitted over a network. In the depicted embodiment, packets are transmitted over network 20. For example, client computer 30 may send packets of data to server computer 40 over network 20. In order to evaluate the I/O throughput for distributed data environment 10, metrics data may, for example, include the total time required to transmit the packets. In another example, the number of packets is used to evaluate the I/O throughput for distributed data environment 10.

Metrics data may also include a weighting factor associated with a metrics measurement. A weighting factor is an estimated value that indicates the relative importance or impact of each item in a group compared to the other items in the group. After receiving metrics data, metrics program 90 uses pre-defined weighting factors to adjust the metrics data. Metrics program 90 uses the adjusted metrics data to calculate I/O throughput for server computer 40, storage 70, server computer 50, and storage 80.

In one embodiment, metrics program 90 uses a pre-defined weighting factor to adjust each metrics measurement. In another embodiment, a user can access metrics program 90 and modify the weighting factors. In yet another embodiment, metrics program 90 does not use weighting factors.

Metrics data can include any of the exemplary measurements described above, a combination or the described measurements, or another type of measurement.

Metrics program 90 compares the adjusted metrics data for server computer 50 and storage 80 to the adjusted metrics data for server computer 40 and storage 70 and determines which storage has the lowest I/O throughput. Metrics program 90 determines that the storage device that has the lowest I/O throughput will be primary storage device for the copy of software program data. Metrics program 90 selects the storage with the higher I/O throughput to function as the secondary storage for another copy of the software program data.

FIG. 2 is a table that includes exemplary metrics data, weighting factors, and calculations for metrics program 90 to determine a primary storage device and a secondary storage device for a copy of data. In the depicted embodiment, column 210 includes labels for metrics data listed in rows 212, 214, 216 and 218. Row 212 includes measured values of read data blocks rate for storage 70 (column 220) and storage 80 (column 230), a weighting factor for read data blocks rate (column 260), the adjusted read data blocks rate for storage 70 (column 270), and the adjusted read data blocks rate for storage 80 (column 280). Row 214 includes measured values of written data blocks rate for storage 70 (column 220) and storage 80 (column 230), a weighting factor for written data blocks rate (column 260), the adjusted written data blocks rate for storage 70 (column 270), and the adjusted written data blocks rate for storage 80 (column 280). Row 216 includes measured values of network traffic in packets per minute for server computer 40 (column 240) and server computer 50 (column 250), a weighting factor for network traffic (column 260), the adjusted network traffic for server computer 40 that contains storage 70 (column 270), and the adjusted network traffic for server computer 50 that contains storage 80 (column 280). Row 218 includes total adjusted I/O throughput for storage 70 (column 270) and for storage 80 (column 280), calculated using the adjusted metrics data for storage 70 and storage 80, respectively.

Column 220 includes measurements of metrics data for storage 70, such as read data blocks rate (row 212) and written data blocks rate (row 214). Column 230 includes measurements of metrics data for storage 80, such as read data blocks rate (row 212) and written data blocks rate (row 214). Column 240 includes network traffic for server computer 40 (row 216). Column 250 includes network traffic for server computer 50 (row 216). Column 260 includes pre-defined weighting factors for read data blocks rate (row 212), written data blocks rate (row 214), and network traffic (row 216).

Column 270 includes adjusted metrics data, after adjusting for each weighting factor, for read data blocks rate (row 212), written data blocks rate (row 214), and network traffic (row 216), and total I/O throughput (row 218). Total I/O throughput (column 270, row 218) is a sum of the other values in column 270, such as read data blocks rate (row 212), written data blocks rate (row 214), and network traffic (row 216). Column 280 includes adjusted metrics data, after adjusting for each weighting factor, for read data blocks rate (row 212), written data blocks rate (row 214), and network traffic (row 216), and total I/O throughput (row 218). Total I/O throughput (column 280, row 218) is a sum of the other values in column 280, such as read data blocks rate (row 212), written data blocks rate (row 214), and network traffic (row 216). Total I/O throughput is the total I/O throughput after the weighting factors have been used to adjust the metrics data.

Metrics program 90 adjusts the metrics data by multiplying each value by a weighting factor. Metrics program 90 determines the adjusted metrics data for storage 70. As shown in column 260, row 212, the weighting factor for read data blocks rate is 0.25. Metrics program 90 multiplies the read data blocks rate for storage 70, which is 10.00 read data blocks per minute (column 220, row 212), by the weighting factor for read data blocks rate, which is 0.25, to calculate the adjusted read data blocks rate for storage 70. The adjusted metrics data for storage 70 are listed in column 270. The adjusted read data blocks rate for storage 70 is 2.50 (column 270, row 212). As shown in column 260, row 212, the weighting factor for written data blocks rate is 0.50. Metrics program 90 multiplies the written data blocks rate for storage 70, which is 20.00 written data blocks per minute (column 230, row 212), by the weighting factor of 0.50, to calculate the adjusted written data blocks rate for storage 70. The adjusted written data blocks rate for storage 70 is 10.00 (column 270, row 214).

As shown in column 260, row 216, the weighting factor for network traffic is 0.25. Metrics program 90 multiplies the network traffic for server computer 40, which is 100.00 packets per minute (column 240, row 216), by the weighting factor of 0.25, to calculate the adjusted network traffic for server computer 40, which hosts storage 70. The adjusted network traffic for server computer 40 is 25.00 (column 270, row 216). Metrics program 90 adds the adjusted metrics data for storage 70 (column 270, rows 212, 214, and 216) to determine the total I/O throughput for storage 70. The total I/O throughput for storage 70 is 37.50 (column 270, row 218).

Metrics program 90 determines the adjusted metrics data for storage 80. As shown in column 260, row 212, the weighting factor for read data blocks rate is 0.25. Metrics program 90 multiplies the read data blocks rate for storage 80, which is 20.00 read data blocks per minute (column 230, row 212), by the weighting factor for read data blocks rate, which is 0.25, to calculate the adjusted read data blocks rate for storage 80. The adjusted metrics data for storage 80 are listed in column 280. The adjusted read data blocks rate for storage 80 is 5.00 (column 280, row 212). As shown in column 260, row 212, the weighting factor for written data blocks rate is 0.50. Metrics program 90 multiplies the written data blocks rate for storage 80, which is 10.00 written data blocks per minute (column 230, row 214), by the weighting factor of 0.50, to calculate the adjusted written data blocks rate for storage 80. The adjusted written data blocks rate for storage 80 is 5.00 (column 280, row 212).

As shown in column 260, row 216, the weighting factor for network traffic is 0.25. Metrics program 90 multiplies the network traffic for server computer 50, which is 50.00 packets per minute (column 250, row 216), by the weighting factor of 0.25, to calculate the adjusted network traffic for server computer 50, which hosts storage 80. The adjusted network traffic for server computer 50 is 12.50 (column 280, row 216). Metrics program 90 adds the adjusted metrics data for storage 80 (column 280, rows 212, 214, and 216) to determine the total I/O throughput for storage 80. The total I/O throughput for storage 80 is 22.50 (column 280, row 218).

In the depicted embodiment, metrics program 90 determines that storage 80 will be the primary storage device because storage 80 has a lower total I/O throughput of 22.50 (column 280, row 218) than storage 70 which has a total I/O throughput of 37.50 (column 270, row 218).

Figure 3:
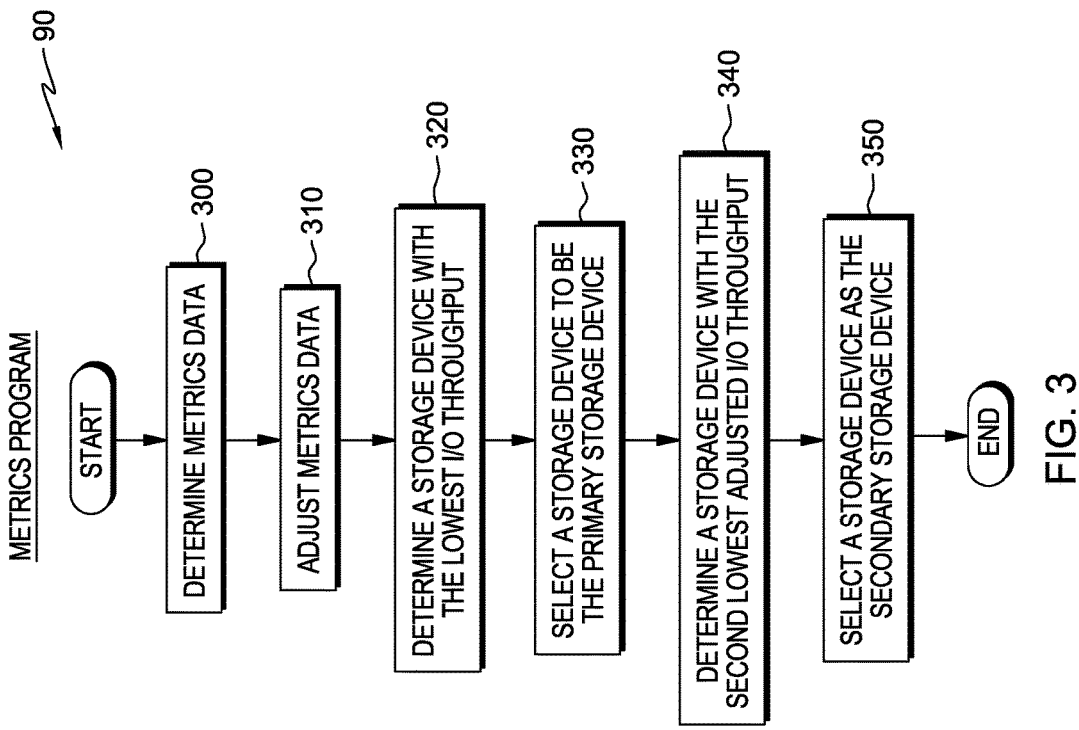
FIG. 3 is a flowchart depicting operational steps of a metrics program, executing within the environment of FIG. 1, for determining a primary storage device and a secondary storage device for a copy of software program data, in accordance with one embodiment of the present invention.

FIG. 3 depicts a flowchart of the steps of metrics program 90 for determining a primary device for a copy of software program data and a secondary storage device for another copy of software program data, in accordance with one embodiment of the present invention.

Initially, in the depicted embodiment, storage 70 operates as primary storage and storage 80 operates as secondary storage. Storage 70 and storage 80 each contain a copy of software program data (software program data copy 75 and software program data 85, respectively). Software program 60 periodically accesses storage 70 and storage 80 over network 20 and software program 60 updates software program data copy 75 and software program data 85, respectively. In other embodiments, there may be a plurality of storage devices and servers distributed within the distributed data processing environment of FIG. 1 for metrics program 90 to analyze.

In step 300, metrics program 90 determines metrics data of server computer 40, storage 70, server computer 50, and storage 80. In the depicted embodiment, metrics program 90 accesses server computer 40, storage 70, server computer 50, and storage 80 and measures metrics data. For example, metrics program 90 measures the running average of the most recent read data blocks for storage 70 and storage 80. A running average of the most recent read data blocks rate may, for example, be 10 read data blocks per minute. In other embodiments, metrics program 90 receives metrics from a monitoring program.

In step 310, metrics program 90 adjusts the metrics data. In one embodiment metrics program 90 uses pre-defined weighting factors to adjust metrics data. Metrics program 90 multiplies each metrics measurement by a pre-defined weighting factor. For example, the read data blocks measurement is 10.00 read data blocks per minute and the weighting factor for read data blocks is 0.25. In this example, metrics program 90 multiplies the read data blocks measurement, 10.00, by the weighting factor, 0.25, and determines that the read data blocks rate is 2.50.

In step 320, metrics program 90 determines the storage device with the lowest I/O throughput. Metrics program 90 adds the adjusted metrics data rates together to determine the adjusted total I/O throughput. For example, metrics program adds together the adjusted read blocks data rate for storage 70, adjusted written blocks data rate for storage 70, and adjusted network traffic rate for server computer 40 (which hosts storage 70) to determine the adjusted total I/O throughput for storage 70. Metrics program adds together the adjusted read blocks data rate for storage 80, adjusted written blocks data rate for storage 80, and adjusted network traffic rate for server computer 50 (which hosts storage 80) to determine the adjusted total I/O throughput for storage 80.

In the depicted embodiment, metrics program 90 compares the adjusted metrics data for server computer 40, storage 70, server computer 50, and storage 80 determined in step 300. For example, metrics program 90 compares the adjusted total I/O throughput for storage 70 to the adjusted total I/O throughput for storage 80. Metrics program 90 determines the storage device with the lowest adjusted I/O throughput.

In step 330, metrics program 90 selects the storage device to be the primary storage device. In the depicted embodiment, metrics program 90 selects the storage device with the lowest adjusted I/O throughput to be the primary storage device. For example, if metrics program 90 determines that storage 80 has the lowest adjusted I/O throughput in calculated in step 310, metrics program 90 selects storage 80 to function as the primary storage device.

In step 340, metrics program 90 determines the storage device with the next lowest adjusted I/O throughput determined in step 320. In one embodiment, in a distributed data processing environment that is comprised of more than two storage devices, metrics program 90 determines a storage device that has a higher adjusted I/O throughput than the storage device selected as the primary storage device and that also has a lower adjusted I/O throughput than the remaining storage devices. Metrics program 90 compares the adjusted I/O throughput of the storage devices that are higher than the adjusted I/O throughput of the storage device determined in step 320.

In the depicted embodiment, distributed data processing environment 10 is comprised of two storage devices (e.g. storage 70 and storage 80). Because storage 80 was selected as the primary storage device in step 320, storage 70 is determined as the storage device with the second lowest I/O throughput.

In step 340, metrics program 90 selects a storage device as the secondary storage device. In the depicted embodiment, metrics program 90 selects a storage device with higher adjusted I/O throughput than the primary storage device selected in step 320 as the secondary storage device. Metrics program 90 selects storage 70 to function as the secondary storage device.

Figure 4:
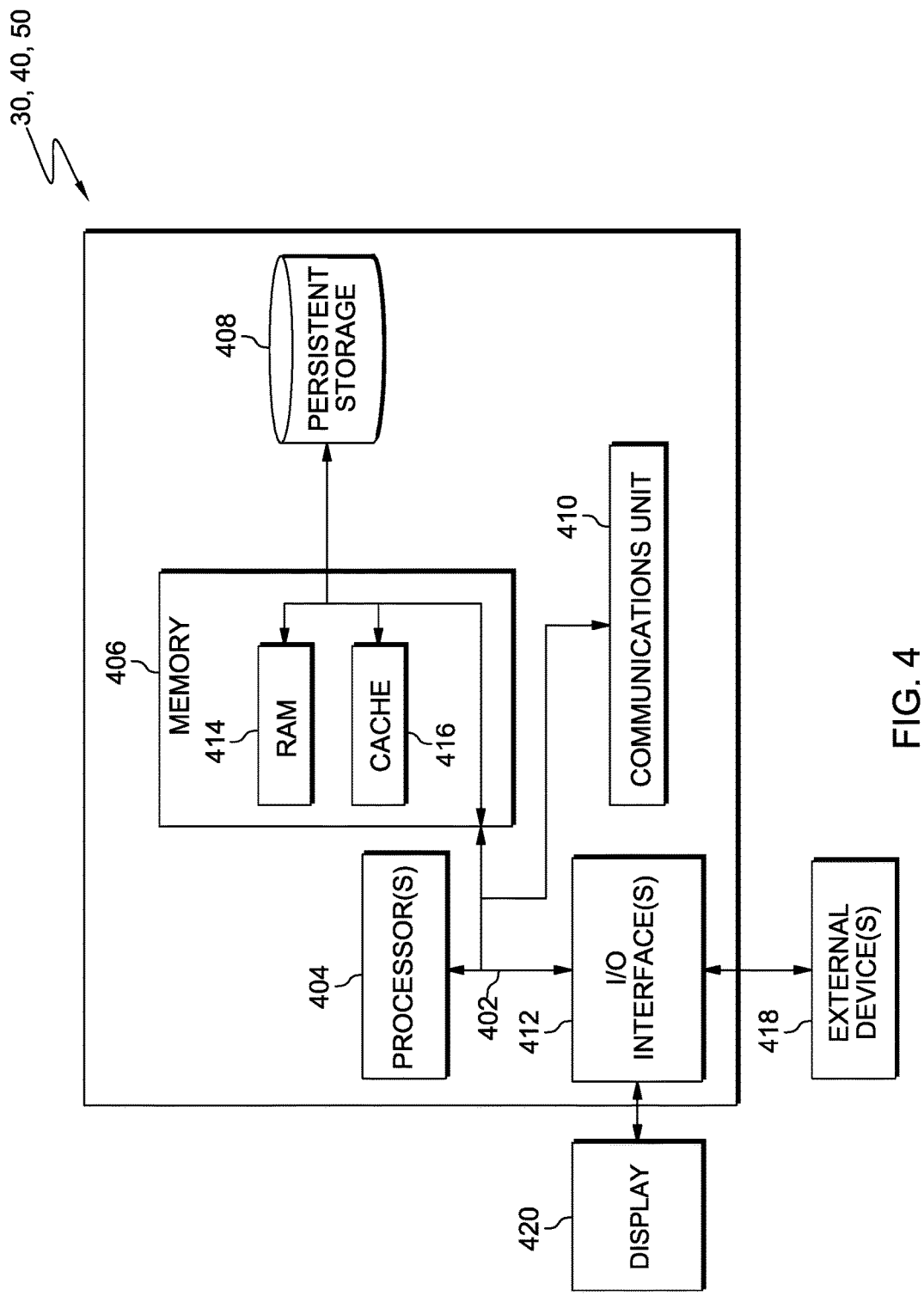
FIG. 4 depicts a block diagram of components of the server computers and the client computer of FIG. 1, in accordance with one embodiment of the present invention.

FIG. 4 depicts a block diagram of components of client computer 30, server computer 40, and server computer 50 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Client computer 30, server computer 40, and server computer 50 can each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Software program 60 is stored in persistent storage 408 of client computer 30 for execution by one or more of the respective computer processors 404 of client computer 30 via one or more memories of memory 406 of client computer 30. Software program data copy 75 is stored in persistent storage 408 of server computer 40 for execution and/or access by one or more of the respective computer processors 404 of server computer 40 via one or more memories of memory 406 of server computer 40. Software program data copy 85 and metrics program 90 are stored in persistent storage 408 of server computer 50 for execution and/or access by one or more of the respective computer processors 404 of server computer 50 via one or more memories of memory 406 of server computer 50. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media capable of storing program instructions or digital information.

The media used by persistent storage 408 may also be removable. For example, a removable hard drive may be used for persistent storage 408. Other examples include optical and magnetic disks, thumb drives, and smart cards inserted into a drive for transfer onto another computer-readable storage medium that is also part of persistent storage 408.

Communications unit 410, in these examples, provides for communications with other servers or devices. In these examples, communications unit 410 includes one or more network interface cards. Communications unit 410 may provide communications through the use of either or both physical and wireless communications links. Software program 60 may be downloaded to persistent storage 408 of client computer 30 through the communications unit 410 of client computer 30. Software program data copy 75 may be downloaded to persistent storage 408 of server computer 40 through the communications unit 410 of server computer 40. Software program data copy 85 and metrics program 90 may be downloaded to persistent storage 408 of server computer 50 through the communications unit 410 of server computer 50.

I/O interface(s) 412 allows for input and output of data with other devices that may be connected to client computer 30, server computer 40, or server computer 50. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., software program 60, can be stored on such portable computer-readable storage media and can be loaded onto persistent storage 408 of client computer 30, respectively, via the respective I/O interface(s) 412 of client computer 30. Software and data used to practice embodiments of the present invention, e.g., software program data copy 75, can be stored on such portable computer-readable storage media and can be loaded onto persistent storage 408 of server computer 40 via I/O interface(s) 412 of server computer 40. Software and data used to practice embodiments of the present invention, e.g., software program data copy 85 and metrics program 90, can be stored on such portable computer-readable storage media and can be loaded onto persistent storage 408 of server computer 50 via I/O interface(s) 412 of server computer 50.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method comprising:
   determining, by one or more processors, a first set of metrics data for a first storage device hosted by a first server computer and a second storage device hosted by a second server computer located in a computing environment, wherein the first storage device and the second storage device each includes a copy of stored data, and wherein the first set of metrics data includes at least: (i) a read data blocks rate for each respective storage device that is a rate at which data is read from the respective storage device by the storage device's respective server, and (ii) a written data blocks rate for each respective storage device that is a rate at which data is written to the respective storage device by the storage device's respective server;
   determining, by one or more processors, a second set of metrics data for the first server computer and the second server computer that includes a data packet transmission rate by the first server computer for first storage device and by the second server computer for the second storage device;
   adjusting, by one or more processors, the first set and the second set of metrics data using a predefined weighting factor for the read data blocks rates, a predefined weighting factor for the written data blocks rates, and a predefined weighing factor for the data packet transmission rate;
   determining, by one or more processors, a first and a second I/O throughput value based on the adjusted first set and the second set of metrics data for the first storage device and the second storage device, wherein the first I/O throughput is a sum of a first adjusted read data block rate, a first adjusted written data block rate, and a first adjusted data packet transmission rate for the first storage device, and wherein the second I/O throughput is a sum of a second adjusted read data block rate, a second adjusted written data block rate, and a second adjusted data packet transmission rate for the second storage device; and
   selecting, by one or more processors, the first storage device with a lowest determined I/O throughput as a primary storage device for accessing the copy of the stored data, wherein the lowest determined I/O throughput is the first I/O throughput.

2. The computer-implemented method of claim 1, further comprising:
   selecting, by one or more processors, the second storage device with a second lowest determined I/O throughput as a secondary storage device for accessing the copy of the stored data, wherein the second lowest determined I/O throughput is the second I/O throughput.

3. The computer-implemented method of claim 1, wherein the first and the second metrics data further includes command execution times of commands associated with an Open Systems Interconnection (OSI) layer.

4. The computer-implemented method of claim 1, wherein the first and the second metrics data further includes command execution times of commands associated with a statistical analysis system (SAS) device driver.

5. A computer program product comprising one or more computer-readable storage media and program instructions stored on the one or more computer-readable storage media, the program instructions comprising:
   program instructions to determine a first set of metrics data for a first storage device hosted by a first server computer and a second storage device hosted by a second server computer located in a computing environment, wherein the first storage device and the second storage device each includes a copy of stored data, and wherein the first set of metrics data includes at least: (i) a read data blocks rate for each respective storage device that is a rate at which data is read from the respective storage device by the storage device's respective server, and (ii) a written data blocks rate for each respective storage device that is a rate at which data is written to the respective storage device by the storage device's respective server;
   program instructions to determine a second set of metrics data for the first server computer and the second server computer that includes a data packet transmission rate by the first server computer for first storage device and by the second server computer for the second storage device;
   program instructions to adjust the first set and the second set of metrics data using a predefined weighting factor for the read data blocks rates, a predefined weighting factor for the written data blocks rates, and a predefined weighing factor for the data packet transmission rate;
   program instructions to determine a first and a second I/O throughput value based on the adjusted first set and the second set of metrics data for the first storage device and the second storage device, wherein the first I/O throughput is a sum of a first adjusted read data block rate, a first adjusted written data block rate, and a first adjusted data packet transmission rate for the first storage device, and wherein the second I/O throughput is a sum of a second adjusted read data block rate, a second adjusted written data block rate, and a second adjusted data packet transmission rate for the second storage device; and
   program instructions to select the first storage device with a lowest determined I/O throughput as a primary storage device for accessing the copy of the stored data, wherein the lowest determined I/O throughput is the first I/O throughput.

6. The computer program product of claim 5, wherein the program instructions further comprise:
   program instructions to select the second storage device with a second lowest determined I/O throughput as a secondary storage device for accessing the copy of the stored data, wherein the second lowest determined I/O throughput is the second I/O throughput.

7. The computer program product of claim 5, wherein the first and the second metrics data further includes command execution times of commands associated with an Open Systems Interconnection (OSI) layer.

8. The computer program product of claim 5, wherein the first and the second metrics data further includes command execution times of commands associated with a statistical analysis system (SAS) device driver.

9. A computer system comprising:

one or more computer processors;

one or more computer-readable storage media; and program instructions stored on the computer-readable storage media for execution by at least one of the one or more processors, the program instructions comprising:

program instructions to determine a first set of metrics data for a first storage device hosted by a first server computer and a second storage device hosted by a second server computer located in a computing environment, wherein the first storage device and the second storage device each includes a copy of stored data, and wherein the first set of metrics data includes at least: (i) a read data blocks rate for each respective storage device that is a rate at which data is read from the respective storage device by the storage device's respective server, and (ii) a written data blocks rate for each respective storage device that is a rate at which data is written to the respective storage device by the storage device's respective server;

program instructions to determine a second set of metrics data for the first server computer and the second server computer that includes a data packet transmission rate by the first server computer for first storage device and by the second server computer for the second storage device;

program instructions to adjust the first set and the second set of metrics data using a predefined weighting factor for the read data blocks rates, and a predefined weighting factor for the written data blocks rates, and a predefined weighing factor for the data packet transmission rate;

program instructions to determine a first and a second I/O throughput value based on the adjusted first set and the second set of metrics data for the first storage device and the second storage device, wherein the first I/O throughput is a sum of a first adjusted read data block rate, a first adjusted written data block rate, and a first adjusted data packet transmission rate for the first storage device, and wherein the second I/O throughput is a sum of a second adjusted read data block rate, a second adjusted written data block rate, and a second adjusted data packet transmission rate for the second storage device; and program instructions to select the first storage device with a lowest determined I/O throughput as a primary storage device for accessing the copy of the stored data, wherein the lowest determined I/O throughput is the first I/O throughput.

10. The computer system of claim 9, wherein the program instructions further comprise:

program instructions to select the second storage device with a second lowest determined I/O throughput as a secondary storage device for accessing the copy of the stored data, wherein the second lowest determined I/O throughput is the second I/O throughput.

11. The computer system of claim 9, wherein the first and the second metrics data further includes command execution times of commands associated with an Open Systems Interconnection (OSI) layer.

12. The computer system of claim 9, wherein the first and the second metrics data further includes command execution times of commands associated with a statistical analysis system (SAS) device driver.

\* \* \* \* \*